United States Patent
Hasegawa

(10) Patent No.: US 7,320,433 B2
(45) Date of Patent: *Jan. 22, 2008

(54) MARKER FOR CODED ELECTRONIC ARTICLE IDENTIFICATION SYSTEM

(75) Inventor: Ryusuke Hasegawa, Morristown, NJ (US)

(73) Assignee: Metglas, Inc., Conway, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/607,993

(22) Filed: Dec. 4, 2006

(65) Prior Publication Data

US 2007/0080226 A1    Apr. 12, 2007

Related U.S. Application Data

(63) Continuation-in-part of application No. 11/095,559, filed on Apr. 1, 2005.

(51) Int. Cl.
G06K 19/06 (2006.01)

(52) U.S. Cl. .................................. 235/493; 235/449

(58) Field of Classification Search ............... 235/493, 235/494, 449; 340/568, 572.2, 572.1, 588
See application file for complete search history.

(56) References Cited

U.S. PATENT DOCUMENTS

| | | | |
|---|---|---|---|
| 4,142,571 | A |   | 3/1979  | Narasimhan |
| 4,510,489 | A |   | 4/1985  | Anderson, III et al. |
| 4,510,490 | A |   | 4/1985  | Anderson, III et al. |
| 5,495,231 | A |   | 2/1996  | Hasegawa |
| 5,539,380 | A |   | 7/1996  | Hasegawa et al. |
| 5,628,840 | A |   | 5/1997  | Hasegawa |
| 5,650,023 | A |   | 7/1997  | Hasegawa et al. |
| 5,969,612 | A |   | 10/1999 | Gadonniex et al. |
| 6,073,845 | A | * | 6/2000  | Kawase ............... 235/449 |
| 6,093,261 | A |   | 7/2000  | Hasegawa et al. |
| 6,095,416 | A | * | 8/2000  | Grant et al. ........... 235/449 |
| 6,187,112 | B1 |   | 2/2001  | Hasegawa et al. |
| 6,299,702 | B1 |   | 10/2001 | Herzer |
| 6,359,563 | B1 |   | 3/2002  | Herzer |
| 7,026,938 | B2 |   | 4/2006  | Herzer |
| 7,065,440 | B2 |   | 6/2006  | Aral |
| 7,088,247 | B2 | * | 8/2006  | Herzer et al. ............ 340/572.6 |
| 7,205,897 | B2 | * | 10/2006 | Hasegawa et al. ....... 340/568.1 |

OTHER PUBLICATIONS

Ito, Shigeyasu et al., "Magnetostriction and magnetization of iron-based amorphous alloys", Applied Physics. Letters, vol. 37, No.7, pp. 665-666, (Oct. 1980).
Chikazumi, Soshin, "Physics of Magnetism", John Wiley & Sons, New York, pp. 431-437 (1964).
PCT Notification of transmittal of the international search report and the written opinion of the international searching authority, or the declaration, Form PCT/ISA/220, 2 pages dated Sep. 7, 2006 (for a related for PCT/US06/11838).
PCT International Search Report, Form PCT/ISA/210, 2 pages, dated Sep. 7, 2006 (for a related for PCT/US06/11838).
PCT Written opinion of the international Searching Authority, Form PCT/ISA/237, 7 pages, dated Sep. 7, 2006 (for a related for PCT/US06/11838).
U.S. Appl. No. 11/095,611, filed Dec. 4, 2006, Hasegawa et al., Metglas, Inc.
U.S. Appl. No. 11/095,611, filed Apr. 1, 2005, Hasegawa et al., Metglas, Inc.
U.S. Appl. No. 11/095,559, filed Apr. 1, 2005, Hasegawa, Metglas, Inc..

* cited by examiner

Primary Examiner—Daniel Stcyr

(57) ABSTRACT

A coded marker in a magnetomechanical resonant electronic article identification system, includes a plurality of ductile magnetostrictive elements or strips based on an amorphous magnetic alloy ribbon with improved magnetomechanical resonance performance. The coded marker takes full advantage of the improved magnetomechanical properties, and an electronic article identification system utilizes the coded marker. The improved encodable and decodable marker/identification system is capable of identifying considerably larger number of articles than conventional systems.

22 Claims, 15 Drawing Sheets

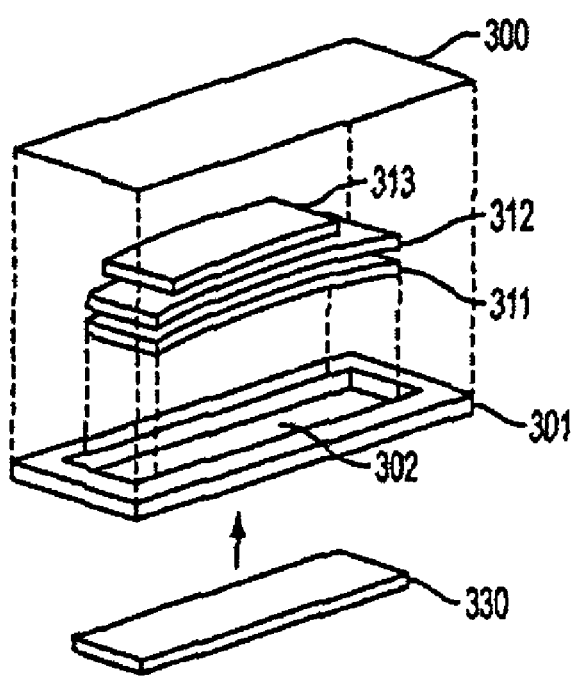
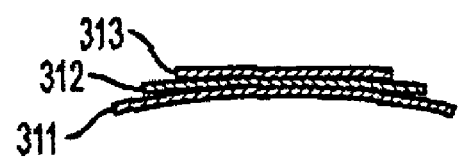
FIG. 11B
FIG. 11A

MARKER FOR CODED ELECTRONIC ARTICLE IDENTIFICATION SYSTEM

CROSS-REFERENCE TO RELATED APPLICATION

This application is a continuation-in-part of U.S. Ser. No. 11/095,559, filed Apr. 1, 2005, now pending, the disclosure of which is incorporated herein by reference.

BACKGROUND OF THE INVENTION

1. Field of the Invention

The present invention relates to ferromagnetic amorphous alloy ribbon and to a marker for use in an electronic article identification system, the marker including a plurality of rectangular strips based on an amorphous magnetostrictive material that vibrates in an alternating magnetic field mechanically at multiple resonant frequencies, whereby the magnetomechanical effect of the marker is effectively utilized for encoding and decoding purposes. The present invention is also directed to an electronic identification system utilizing such a marker.

2. Background of the Invention

Magnetostriction of a magnetic material is a phenomenon in which a dimensional change takes place upon application of an external magnetic field on the magnetic material. When the dimensional change is such that the material elongates upon its being magnetized, the material is termed "positive-magnetostrictive". When a material is "negative-magnetostrictive", the material shrinks upon its magnetization. Thus in either case, a magnetic material vibrates when it is in an alternating magnetic field. When a static magnetic field is applied along with the alternating field, the frequency of the mechanical vibration of the magnetic material varies with the applied static field through magneto-elastic coupling. This is commonly known as ΔE effect, which is described, for example, in "Physics of Magnetism" by S. Chikazumi (John Wiley & Sons, New York, 1964, page 435). Here E(H) stands for Young's modulus which is a function of an applied field H, and the material's vibrational or resonance frequency $f_r$ is related to E(H) through $$f_r (½l)[E(H)/\rho]^{1/2}, \quad (1)$$

where l is the length of the material and ρ is the mass density of the material. The magneto-elastic or magneto-mechanical effect described above is utilized in electronic article surveillance systems which were first taught in the U.S. Pat. Nos. 4,510,489 and 4,510,490 (hereinafter the '489 and '490 patents). Such surveillance systems are advantageous systems, in that they offer a combination of high detection sensitivity, high operating reliability and low operating costs.

The marker in such systems is a strip, or a plurality of strips, of known length of a ferromagnetic material, packaged with a magnetically harder ferromagnet (material with a higher coercivity) that provides a static field termed as biasing field to establish peak magneto-mechanical coupling. In accordance with embodiments of the invention, ferromagnetic marker material is an amorphous alloy ribbon, since the efficiency of magneto-mechanical coupling in the alloys is very high. The mechanical resonance frequency, $f_r$, is determined essentially by the length of the alloy ribbon and the biasing field strength, as the above Equation (1) indicates. When an interrogating signal tuned to the resonance frequency is encountered in an electronic identification system, the marker material responds with a large signal field which is detected by a receiver in the system.

Several amorphous ferromagnetic materials were considered in the U.S. Pat. No. 4,510,490 for coded identification systems based on magnetomechanical resonance described above and included amorphous Fe—Ni—Mo—B, Fe—Co—B—Si, Fe—B—Si—C and Fe—B—Si alloys. Of the alloys, a commercially available amorphous Fe—Ni—Mo—B based METGLAS®2826MB alloy was used extensively until accidental triggering, by a magnetomechanical resonance marker, of other systems based on magnetic harmonic generation/detection. This occurs because a magnetomechanical resonance marker used at that time sometimes exhibited non-linear BH characteristics, resulting in generation of higher harmonics of the exciting field frequency. To avoid this problem, sometimes called a system "pollution problem," a series of new marker materials have been invented, examples of which are disclosed in U.S. Pat. Nos. 5,495,231, 5,539,380, 5,628,840, 5,650,023, 6,093,261 and 6,187,112. Although the new marker materials perform, on average, better than the materials utilized in the surveillance systems of the original '489 and '490 patents, somewhat better magnetomechanical performance has been found in the marker materials disclosed, for example, in U.S. Pat. No. 6,299,702 (hereinafter '702 patent). These new marker materials require complex heat-treatment processes to achieve desired magnetomechanical properties as disclosed, for example, in the '702 patent. Clearly, a new magnetomechanical marker material is needed which does not require such complicated post-ribbon fabrication processes and it is one aim of the present invention to provide such a marker material with high magnetomechanical performance without causing "pollution problem" mentioned above. Fully utilizing the new magnetomechanical marker material of the present invention, the present invention includes a marker with encoding and decoding capability and an electronic identification system utilizing the marker. A coded surveillance system having a magnetomechanical marker was taught in U.S. Pat. No. 4,510,490, but the number of constituent marker strips was limited due to a limited space available in a marker, thus limiting the universe of encoding and decoding capability using such a marker.

Clearly, a marker is needed in which the number of marker strips is increased considerably without sacrificing the performance as a coded marker in an electronic article identification system having encoding and decoding capability, hereinafter termed "coded electronic article identification system."

SUMMARY OF THE INVENTION

In accordance with the invention, a soft magnetic material is included in a marker of an electronic identification system based on magnetomechanical resonance.

A marker material with enhanced overall magnetomechanical resonance properties is fabricated from an amorphous alloy ribbon so that a multiple of marker strips are housed in a coded marker. A soft magnetic material in a ribbon form having magnetomechanical resonance capability is cast on a rotating substrate, as taught in the U.S. Pat. No. 4,142,571. When the as-cast ribbon width is wider than the predetermined width for a marker material, the said ribbon is slit to said predetermined width. The ribbon thus processed is cut into ductile, rectangular amorphous metal strips having different lengths to fabricate a magnetomechanical resonance marker using a plurality of said strips with at least one semi-hard magnet strip which provides a bias static magnetic field.

A coded electronic article identification system utilizes a coded marker of the present invention. The system has an article interrogation zone in which a magnetomechanical marker of the present invention is subject to an interrogating magnetic field with varying frequencies, the signal response to the interrogating magnetic field excitation being detected by a receiver having a pair of antenna coils situated in the article interrogation zone.

In accordance with an embodiment of the invention, there is provided a coded marker of a magnetomechanical resonant electronic article identification system, adapted to resonate mechanically at preselected frequencies, comprising: a plurality of ductile magnetostrictive strips cut to predetermined lengths from amorphous ferromagnetic alloy ribbons that have curvatures along a ribbon length direction and exhibit magnetomechanical resonance under alternating magnetic field excitations with a static bias field, the strips having a magnetic anisotropy direction perpendicular to a ribbon axis, wherein at least two of the strips are adapted to be magnetically biased to resonate at a single, different one of the preselected frequencies.

Where selected, a radius of curvature of the marker strip curvatures is less than 120 cm.

In accordance with an embodiment of the invention, encoding is carried out by cutting an amorphous magnetostrictrive alloy ribbon having its magnetic anisotropy direction perpendicular to ribbon axis to a rectangular strip with a predetermined length having a length-to-width aspect ratio greater than 3.

Where selected, the strips have characteristic time constants for magnetomechanical resonance signal decay ranging from about 0.7 msec to about 3.9 msec.

Where selected, the strips have a strip width ranging from about 3 mm to about 15 mm.

In accordance with an embodiment of the invention, the strips have a slope of resonance frequency versus bias field ranging from about 4 Hz/(A/m) to about 14 Hz/(A/m).

Where selected, the strips have a length greater than about 18 mm when a strip width is 6 mm.

In accordance with an embodiment of the invention, the strips have a magnetomechanical resonance frequency less than about 120,000 Hz.

In accordance with an embodiment of the invention, the amorphous ferromagnetic alloy ribbons have a saturation magnetostriction between about 6 ppm and about 18 ppm and a saturation induction between about 0.6 tesla and about 1.1 tesla.

Where selected, the amorphous ferromagnetic alloy ribbons have characteristic BH loops with near-zero remanent magnetic inductions at zero-applied magnetic field.

In accordance with an embodiment of the invention, an amorphous ferromagnetic alloy of the amorphous ferromagnetic alloy ribbons has a composition based on $Fe_a$—$Ni_b$—$Mo_c$—$B_d$ with $30 \leq a \leq 43$, $35 \leq b \leq 48$, $0 \leq c \leq 5$, $14 \leq d \leq 20$ and $a+b+c+d=100$, up to 3 atom % of Mo being optionally replaced by Co, Cr, Mn and/or Nb and up to 1.5 atom % of B being optionally replaced by Si and/or C.

In accordance with an embodiment of the invention, an amorphous ferromagnetic alloy of the amorphous ferromagnetic alloy ribbons has a composition of one of: $Fe_{41.7} Ni_{39.4} Mo_{3.1} B_{15.8}$, $Fe_{41.5} Ni_{38.9} Mo_{4.1} B_{15.5}$, $Fe_{39.8} Ni_{39.2} Mo_{3.1} B_{17.6} C_{0.3}$, $Fe_{40.2} Ni_{39.0} Mo_{3.6} B_{16.6} Si_{0.6}$, $Fe_{36.5} Ni_{42.9} Mo_{4.2} B_{16.5}$, $Fe_{40.6} Ni_{40.1} Mo_{3.7} B_{15.1} Si_{0.5}$, $Fe_{39.6} Ni_{38.3} Mo_{4.1} B_{18.0}$, $Fe_{38.0} Ni_{38.8} Mo_{3.9} B_{19.3}$, $Fe_{36.9} Ni_{41.3} Mo_{4.1} B_{17.8}$, $Fe_{36.7} Ni_{41.9} Mo_{4.0} B_{16.6} Si_{0.8}$, $Fe_{35.6} Ni_{42.6} Mo_{4.0} B_{17.9}$, $Fe_{34.7} Ni_{43.5} Mo_{4.0} B_{17.8}$, $Fe_{33.3} Ni_{43.8} Mo_{3.9} Co_{0.2} Cr_{0.1} B_{17.7} Si_{1.0}$, or $Fe_{32.5} Ni_{44.7} Mo_{3.7} Co_{0.1} Cr_{0.2} B_{18.0} Si_{0.8}$.

Where selected, the coded marker comprises at least two marker-strips with different lengths.

Where selected, coded marker comprises five marker-strips with different lengths.

Where selected, the coded marker has a magnetomechanical resonance frequency between about 30,000 and about 130,000 Hz.

Where selected, the coded marker has an electronic identification universe containing more than 115 million separately identifiable articles.

In accordance with an embodiment of the invention, the strips have a magnetomechanical resonance frequency less than about 120,000 Hz.

In accordance with an embodiment of the invention, an electronic article identification system has a capability of decoding coded information of a coded marker. The system comprises one of: a pair of coils emitting an AC excitation field aimed at the coded marker to form an interrogation zone; a pair of signal detection coils receiving coded information from the coded marker; an electronic signal processing device with an electronic computer with a software to decode information coded on the coded marker; or an electronic device identifying the coded marker, wherein the coded marker is adapted to resonate mechanically at preselected frequencies, wherein the coded marker comprises a plurality of ductile magnetostrictive strips cut to predetermined lengths from amorphous ferromagnetic alloy ribbons that have curvatures along a ribbon length direction and exhibit magnetomechanical resonance under alternating magnetic field excitations with a static bias field, the strips having a magnetic anisotropy direction perpendicular to a ribbon axis, wherein at least two of the strips are adapted to be magnetically biased to resonate at a single, different one of the preselected frequencies.

Where selected, and in accordance with embodiments of the invention, a radius of curvature of the marker strip curvatures is between about 20 cm and about 100 cm.

BRIEF DESCRIPTION OF THE DRAWINGS

The invention will be more fully understood and further advantages will become apparent when reference is made to the following detailed description of the embodiments and the accompanying drawings in which:

FIGS. 11A and 11B illustrate a marker of an embodiment of the present invention, in which three strips with different lengths are housed;

DETAILED DESCRIPTION OF THE EMBODIMENTS

A marker material with enhanced overall magnetomechanical resonance properties is fabricated from an amorphous ferromagnetic alloy ribbon so that a multiple of marker strips are housed in a coded marker, wherein at least two of the strips are adapted to be magnetically biased to resonate mechanically at a single, different one of a plurality of preselected frequencies. A magnetic material in a ribbon form having magnetomechanical resonance capability is cast on a rotating substrate, as taught in the U.S. Pat. No. 4,142,571. When the as-cast ribbon width is wider than the predetermined width for a marker material, the ribbon is slit to the predetermined width. The ribbon thus processed is cut into ductile, rectangular amorphous metal strips having different lengths to fabricate a magnetomechanical resonance marker using a plurality of the strips with at least one semi-hard magnet strip which provides a bias static magnetic field.

In one embodiment of the present invention, the amorphous ferromagnetic alloy utilized to form a ribbon for the marker strip has a composition based on $Fe-Ni_b-Mo_c-B_d$ with $30 \leq a \leq 43$, $35 \leq b \leq 48$, $0 \leq c \leq 5$, $14 \leq d \leq 20$ and $a+b+c+d=100$, up to 3 atom % of Mo being optionally replaced by Co, Cr, Mn and/or Nb and up to 1.5 atom % of B being optionally replaced by Si and/or C.

In one embodiment of the present invention, the amorphous ferromagnetic alloy utilized to form a ribbon for the marker strip has a composition of one of: $Fe_{41.7} Ni_{39.4} Mo_{3.1} B_{1.58}$, $Fe_{41.5} Ni_{38.9} Mo_{4.1} B_{15.5}$, $Fe_{39.8} Ni_{39.2} Mo_{3.1} B_{17.6} C_{0.3}$, $Fe_{40.2} Ni_{39.0} Mo_{3.6} B_{16.6} Si_{0.6}$, $Fe_{36.5} Ni_{42.9} Mo_{4.2} B_{16.5}$, $Fe_{40.6} Ni_{40.1} Mo_{3.7} B_{15.1} Si_{0.5}$, $Fe_{39.6} Ni_{38.3} Mo_{4.1} B_{18.0}$, $Fe_{38.0} Ni_{38.8} Mo_{3.9} B_{19.3}$, $Fe_{36.9} Ni_{41.3} Mo_{4.1} B_{17.8}$, $Fe_{36.7} Ni_{41.9} Mo_{4.0} B_{16.6} Si_{0.8}$, $Fe_{35.6} Ni_{42.6} Mo_{4.0} B_{17.9}$, $Fe_{34.7} Ni_{43.5} Mo_{4.0} B_{17.8}$, $Fe_{33.3} Ni_{43.8} Mo_{3.9} Co_{0.2} Cr_{0.1} B_{17.7} Si_{1.0}$, or $Fe_{32.5} Ni_{44.7} Mo_{3.7} Co_{0.1} Cr_{0.2} B_{18.0} Si_{0.8}$.

Figure 1A:
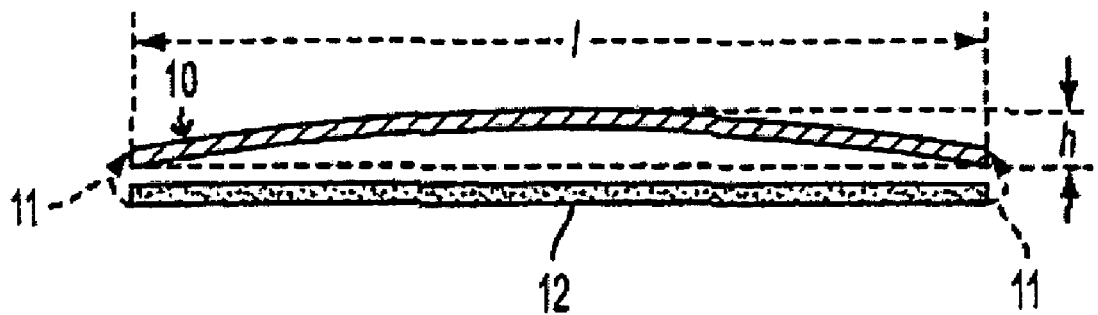
FIG. 1A illustrates a side view of a strip cut from an amorphous alloy ribbon in accordance with an embodiment of the present invention and having a bias magnet.
Figure 1B:
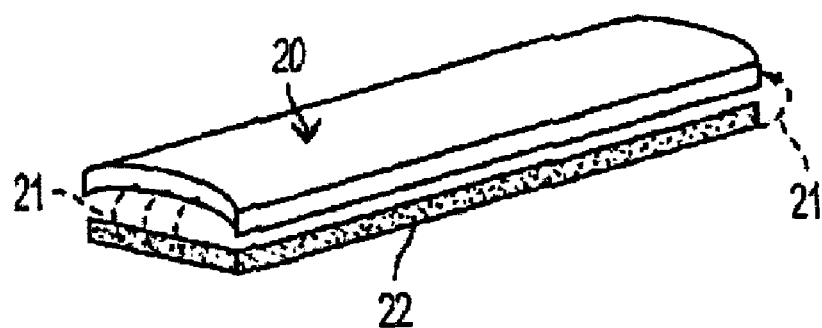
FIG. 1B illustrates a view of a conventional strip with a bias magnet.

Thus, an amorphous alloy ribbon with a chemical composition similar to a chemical composition of a commercially available amorphous magnetostrictive METGLAS®2826MB ribbon was cast in accordance with the invention described in the U.S. Pat. No. 4,142,571. The cast amorphous alloy had a saturation induction of about 0.88 Tesla and a saturation magnetostriction of about 12 ppm. The ribbon had widths of about 100 mm and about 25 mm, and its thickness was about 28 μm. The ribbon was then slit into narrower ribbons with different widths. The slit ribbon then was cut into ductile, rectangular strips having a length ranging from about 15 mm to about 65 mm. Each strip had a slight curvature reflecting ribbon casting wheel surface curvature. During slitting, the original curvature was modified. The curvature of a slit and cut strip was determined as described in Example 1. FIG. 1A illustrates the physical appearance of a marker strip 10 of an embodiment of the present invention, and FIG. 1B illustrates the physical appearance of a conventional strip 20 produced in accordance with a complex heat-treatment method disclosed in the U.S. Pat. No. 6,299,702. As indicated, magnetic flux lines 11 are more closed in a resonance marker-bias strip configuration of an embodiment of the present invention than the magnetic flux lines 21 of a conventional strip, as is illustrated in FIG. 1B. This enables better coupling between a marker strip 10 of an embodiment of the present invention and a bias magnet strip 12 than is achieved by a conventional strip 20 and a bias magnet 22, which results in less magnetic flux leakage at the two ends of a resonance marker strip of an embodiment of the present invention. The shape of a curved marker strip of an embodiment of the present invention as exemplified in FIG. 1A enables the strip to vibrate freely without any physical constraints. This aspect is very important in electronic article identification systems as any physical constraint of a marker strip dampens its mechanical vibration. If a rigid support is introduced at any portion of a marker strip, for example, when the center of a marker strip, whether it is curved or not, is attached to some other material such as the bias magnet 12 in FIG. 1A or marker tag case 100 in FIG. 7A, the resonance frequency of the marker strip nearly doubles according to Eq. (1) and the resonance signal level which is proportional to the strip's physical volume is reduced considerably. This is detrimental for effective operation of an electronic article identification system. Each resonance marker strip of an embodiment of the present invention and of the conventional strip was examined in light of magnetomechanical resonance performance using a characterization method of Example 2.

Figure 2:
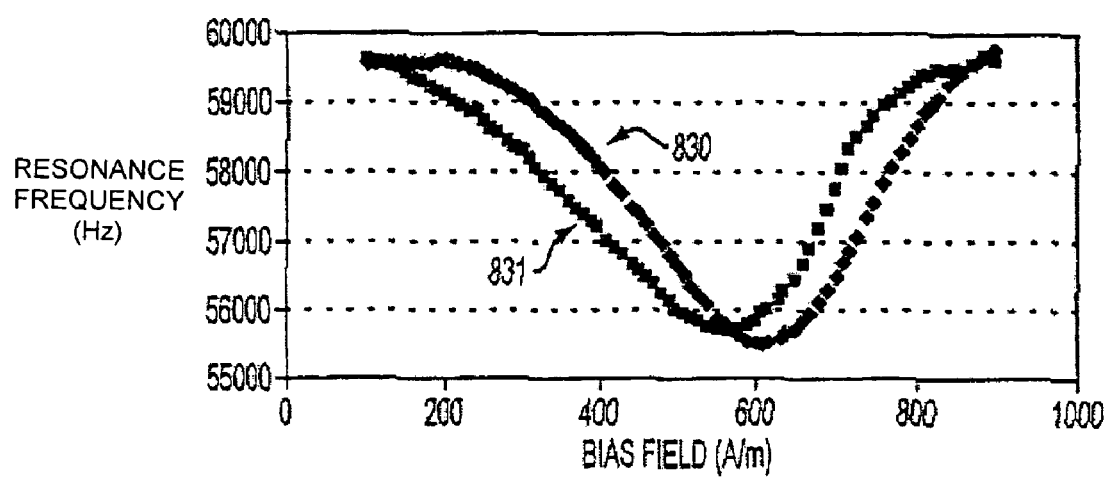
FIG. 2 illustrates magnetomechanical resonance characteristics of a single strip marker in accordance with an embodiment of the present invention and magnetomechanical resonance characteristics of a conventional single strip marker, showing resonance frequency as a function of bias field.

FIG. 2 compares the resonance frequency as a function of bias field for a single strip marker 830 of an embodiment of the present invention and the resonance frequency of a conventional strip 831. FIG. 2 indicates that the resonance frequency change as a function of bias field is about the same for both cases. The resonance characteristics depicted in FIG. 2 are important in designing a resonance marker with deactivation capability because deactivation is accomplished by a change in the resonance frequency by changing bias field strength. During deactivation, the slope of the resonance frequency $f_r$ with respect to bias field $H_b$, i.e. $df_r/dH_b$, determines the effectiveness of deactivation and therefore is an important factor for an effective resonance marker strip. For a marker in an electronic coded identification system, a larger slope of resonance frequency versus bias field is generally selected when a higher sensitivity is desired in an identification system.

Figure 3:
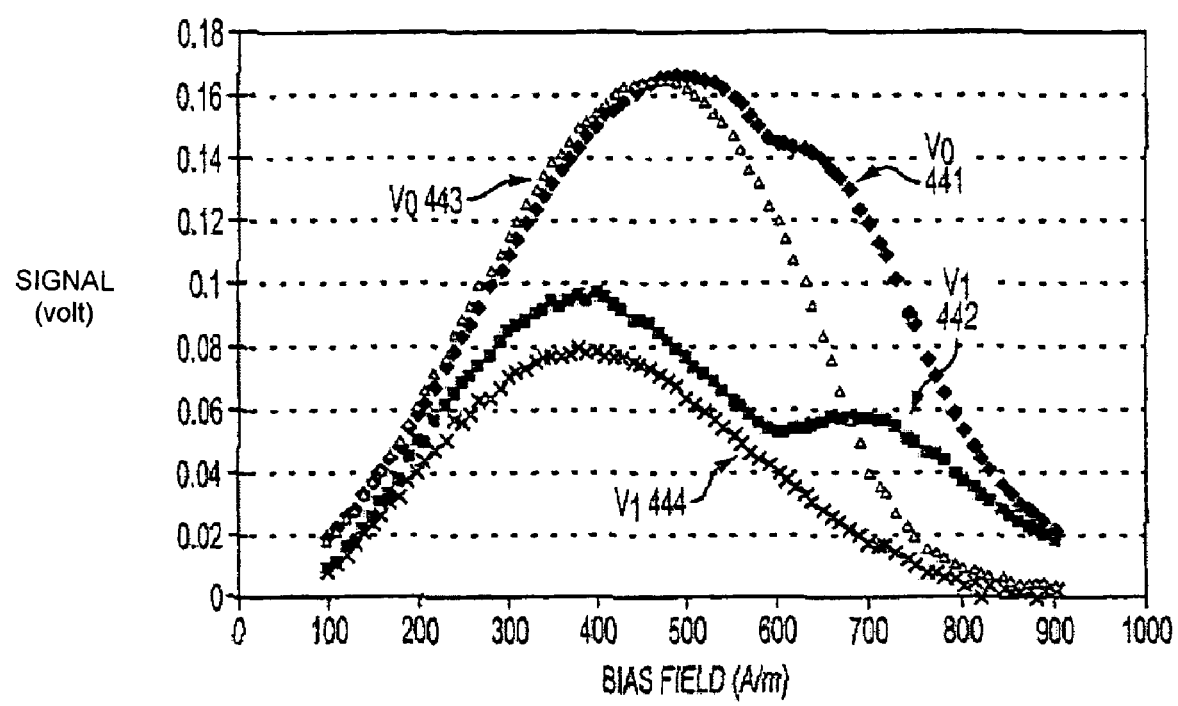
FIG. 3 illustrates resonance signals of a single strip marker in accordance with an embodiment of the present invention and resonance signals of a conventional strip marker, showing resonance signal amplitudes as a function of a bias field.

A comparison of the resonance response between the two cases is illustrated in FIG. 3, in which $V_0$ is the response In Table I, maximum signal voltages for $V_0$ and $V_1$ measured at bias field strengths, $H_{b0}$ and $H_{b1}$, respectively, and the resonance frequency slope, $df_r/dH_b$, measured at $H_{b1}$ for marker strips of an embodiment of the present invention with strip curvature as indicated by h in FIG. 1A were compared with corresponding characteristics for ten conventional marker strips, randomly selected. The length l of the strips were all about 38 mm and their widths were about 6 mm. A radius of curvature for each marker strip was calculated from h and l. The resonance frequency of each strip was about 58 kHz.

TABLE I

Magnetomechanical Resonance Characteristics

| Marker | $V_{0\ max}$ (mV) | $H_{b0}$ (A/m) | $V_{1\ max}$ (mV) | $H_{b1}$ (A/m) | $df_r/dH_b$ [Hz/(A/m)] | h (mm) | Radius of Curvature (cm) |
|---|---|---|---|---|---|---|---|
| Conventional | 140~180 | 440~500 | 60~102 | 360~420 | 5.60~11.5 | — | — |
| Present Invention | | | | | | | |
| No. 1 | 108 | 432 | 76 | 350 | 4.79 | 0.15 | 119 |
| No. 2 | 167 | 490 | 97 | 400 | 12.0 | 0.18 | 100 |
| No. 2 | 156 | 470 | 86 | 410 | 9.50 | 0.18 | 100 |
| No. 4 | 159 | 490 | 84 | 410 | 12.5 | 0.20 | 90 |
| No. 5 | 167 | 490 | 94 | 400 | 11.8 | 0.20 | 90 |
| No. 6 | 183 | 458 | 110 | 390 | 11.8 | 0.23 | 78 |
| No. 7 | 165 | 488 | 94 | 370 | 12.5 | 0.23 | 78 |
| No. 8 | 178 | 471 | 106 | 391 | 12.3 | 0.28 | 65 |
| No. 9 | 160 | 460 | 92 | 379 | 10.8 | 0.28 | 65 |
| No. 10 | 157 | 461 | 87 | 351 | 9.10 | 0.36 | 50 |
| No. 11 | 147 | 420 | 76 | 391 | 10.3 | 0.64 | 28 | signal amplitude when the exciting field is turned off, and $V_1$ is the signal amplitude at 1 msec after the termination of the exciting field. Clearly, a higher $V_1/V_0$ ratio is selected for a better performance of a resonance marker. Both of the signal amplitudes are therefore used in industry as part of the figure of merit for a magnetomechanical resonance marker. FIG. 3 indicates that the signal amplitudes, $V_0$ 441 and $V_1$ 442 become maximum at bias fields of $H_{b0}$=500 A/m and $H_{b1}$=400 A/m, respectively, for a resonance marker strip of an embodiment of the present invention, and $V_0$ 443 and $V_1$ 444 become maximum at bias fields of $H_{b0}$=460 A/m and $H_{b1}$=400 A/m, respectively, for a conventional resonance marker strip. In addition, FIG. 3 indicates that the ratio of $V_1/V_0$ at these maximum points is higher for a resonance marker strip of an embodiment of the present invention than for a conventional marker strip, illustrating that signal retention of a marker strip of an embodiment of the present invention is better than in a conventional marker strip, thus enhancing the effectiveness of the present coded electronic identification system.

Table I summarizes a comparison of parameters critical for the performance of a marker strip as a magnetomechanical resonator between representative conventional marker strips and examples from the marker strips of an embodiment of the present invention. It is noted that the performance of the marker strips of an embodiment of the present invention is close to, or superior to, the performance of a conventional marker strips. All of the marker strips of an embodiment of the present invention in Table I are acceptable for use as markers of the embodiment of the present invention.

Table I contains data for a marker strip width of about 6 mm which is presently widely used. It is one aspect of the present invention to provide marker strips with widths different than about 6 mm. Marker strips with different widths were slit from the same ribbon used in Table I, and their magnetomechanical resonance characteristics were determined. The results are summarized in Table II. The resonance signal voltages, $V_{0\ max}$ and $V_{1\ max}$ decreased with decreasing width as expected. Decrease in the characteristic field values, $H_{b0}$ and $H_{b1}$ with decreasing width is due to demagnetizing effects. Thus, a bias field magnet must be selected accordingly. A marker with a smaller width is suited for a smaller article identification area, whereas a marker with a larger width is suited for a larger article identification area because resonance signals are larger from larger marker strips, as Table II indicates. Since the resonance frequency depends primarily on the strip length, as Equation (1) indicates, the strip width change does not affect the resonance frequency of the article identification system used.

Table II shows the magnetomechanical resonance characteristics of marker strips of an embodiment of the present invention with strip height h, as defined in FIG. 1A and with different strip widths. The definitions for $V_{0\ max}$, $H_{b0}$, $V_{1\ max}$ and $df_r/dH_b$ were the same as in Table I. The length l of the strips were all about 38 mm. A radius of curvature for each marker strip was calculated from h and l. The resonance frequency of each strip was about 58 kHz.

TABLE II

Magnetomechanical Resonance Characteristics

| Marker Width (mm) | $V_{0\,max}$ (mV) | $H_{b0}$ (A/m) | $V_{1\,max}$ (mV) | $H_{b1}$ (A/m) | $df_r/dH_b$ [Hz/(A/m)] | h (mm) | Radius of Curvature (cm) |
|---|---|---|---|---|---|---|---|
| 4 | 107 | 310 | 56 | 330 | 4.69 | 0.61 | 30 |
| 5 | 153 | 300 | 76 | 300 | 6.05 | 0.41 | 44 |
| 9 | 194 | 500 | 101 | 440 | 4.84 | 0.81 | 22 |
| 14 | 321 | 590 | 174 | 511 | 4.86 | 0.84 | 21 |

Another aspect of the present invention is to provide a variety of available markers operated under different conditions. For this purpose, magnetomechanical resonance characteristics were varied by changing the chemical composition of the amorphous magnetic alloy ribbon from which marker strips were produced. The chemical compositions of the alloys examined are listed in Table III in which values of the saturation induction and magnetostrictions for the alloys are given. The results of the magnetomechanical resonance properties of these alloys are given in Table IV below.

Table III shows examples of magnetostrictive amorphous alloys with their compositions, saturation inductions, $B_s$, and saturation magnetostrictions, $\lambda_s$, for magnetomechanical resonance markers of an embodiment of the present invention. The values of $B_s$ were determined from DC BH loop measurements described in Example 3 and the values of $\lambda_s$ were calculated by using an empirical formula $\lambda_s = k\,B_s^2$, with k=15.5 ppm/tesla$^2$, following S. Ito et al., *Applied Physics Letters*, vol. 37, p. 665 (1980).

TABLE III

Magnetostrictive Amorphous Alloy

| Alloy No. | Marker Chemical Composition (numbers in atom %) | Saturation Induction $B_s$ (tesla) | Saturation Magnetostriction $\lambda_s$ (ppm) |
|---|---|---|---|
| A | $Fe_{41.7}Ni_{39.4}Mo_{3.1}B_{15.8}$ | 1.03 | 16 |
| B | $Fe_{41.5}Ni_{38.9}Mo_{4.1}B_{15.5}$ | 0.98 | 15 |
| C | $Fe_{39.8}Ni_{39.2}Mo_{3.1}B_{17.6}C_{0.3}$ | 0.94 | 14 |
| D | $Fe_{40.2}Ni_{39.0}Mo_{3.6}B_{16.6}Si_{0.6}$ | 0.93 | 13.5 |
| E | $Fe_{36.5}Ni_{42.9}Mo_{4.2}B_{16.5}$ | 0.90 | 12.6 |
| F | $Fe_{40.6}Ni_{40.1}Mo_{3.7}B_{15.1}Si_{0.5}$ | 0.88 | 12 |
| G | $Fe_{39.6}Ni_{38.3}Mo_{4.1}B_{18.0}$ | 0.88 | 12 |
| H | $Fe_{38.0}Ni_{38.8}Mo_{3.9}B_{19.3}$ | 0.84 | 11 |
| I | $Fe_{36.9}Ni_{41.3}Mo_{4.1}B_{17.8}$ | 0.83 | 10.5 |
| J | $Fe_{36.7}Ni_{41.9}Mo_{4.0}B_{16.6}Si_{0.8}$ | 0.82 | 10.4 |
| K | $Fe_{35.6}Ni_{42.6}Mo_{4.0}B_{17.9}$ | 0.81 | 10 |
| L | $Fe_{34.7}Ni_{43.5}Mo_{4.0}B_{17.8}$ | 0.75 | 8.7 |
| M | $Fe_{33.3}Ni_{43.8}Mo_{3.9}Co_{0.2}Cr_{0.1}B_{17.7}Si_{1.0}$ | 0.71 | 7.8 |
| N | $Fe_{32.5}Ni_{44.7}Mo_{3.7}Co_{0.1}Cr_{0.2}B_{18.0}Si_{0.8}$ | 0.67 | 7.0 |

Table IV shows the magnetomechanical resonance characteristics of marker strips having different chemical compositions listed in Table III of an embodiment of the present invention with strip height h as defined in FIG. 1A. The definitions for $V_{0\,max}$, $H_{b0}$, $V_{1\,max}$ and $df_r/dH_b$ were the same as in Table I. The lengths l of the strips were all about 38 mm. A radius of curvature for each marker strip was calculated from h and l. The resonance frequency of each strip was about 58 kHz.

TABLE IV

Magnetomechanical Resonance Characteristics of the Alloys in Table III

| Alloy No. | $V_{0\,max}$ (mV) | $H_{b0}$ (A/m) | $V_{1\,max}$ (mV) | $H_{b1}$ (A/m) | $df_r/dH_b$ [Hz/(A/m)] | Radius of Curvature (cm) |
|---|---|---|---|---|---|---|
| A | 188 | 471 | 70 | 368 | 13.0 | 33 |
| B | 174 | 490 | 89 | 348 | 10.4 | 36 |
| C | 160 | 320 | 72 | 300 | 8.80 | 25 |
| D | 158 | 580 | 83 | 580 | 4.85 | 33 |
| E | 180 | 441 | 106 | 370 | 9.29 | 50 |
| F | 184 | 370 | 94 | 330 | 8.10 | 71 |
| G | 171 | 472 | 85 | 351 | 9.73 | 27 |
| H | 146 | 352 | 60 | 250 | 13.4 | 30 |
| I | 160 | 341 | 84 | 329 | 7.06 | 34 |
| J | 160 | 410 | 85 | 340 | 8.92 | 51 |
| K | 154 | 420 | 94 | 389 | 8.51 | 36 |
| L | 166 | 369 | 97 | 309 | 8.77 | 28 |
| M | 182 | 331 | 106 | 280 | 10.1 | 38 |
| N | 128 | 269 | 79 | 250 | 5.58 | 116 |

All of the amorphous alloys with different chemical compositions listed in Table III have excellent magnetomechanical resonance characteristics, as given in Table IV, and therefore are useful in a coded electronic identification system of an embodiment of the present invention.

Figure 4:
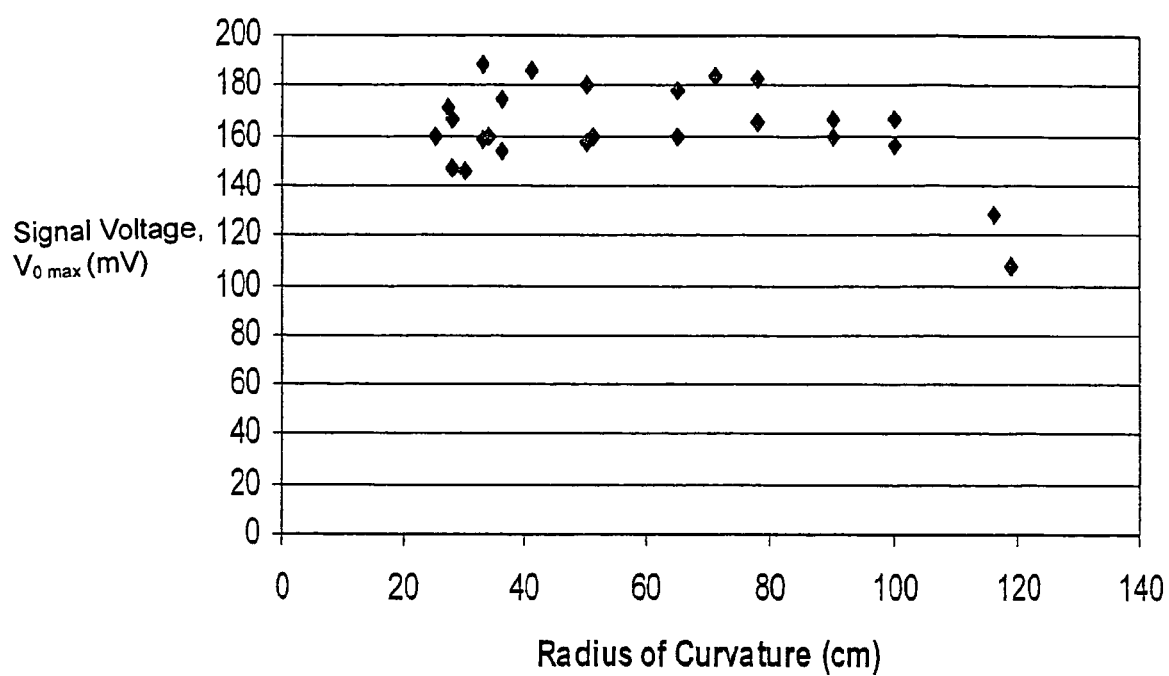
FIG. 4 illustrates signal voltage plotted against radius of curvature of a marker strip of an embodiment of the present invention.

To obtain a selected range for the radius of curvature of a marker strip for embodiments of the present invention, signal voltage $V_{0\,max}$ is plotted in FIG. 4 against a marker strip's radius of curvature using the data given in Tables I and IV. A signal voltage $V_{0\,max}$ exceeding 100 mV is acceptable for a reliable marker performance and therefore any marker strip with a radius of curvature less than 120 cm is suited for a marker strip of the present invention. However, a higher $V_{0\,max}$ is generally selected. As FIG. 4 indicates, high $V_{0\,max}$ values exceeding 140 mV were achieved in the radius of curvature range below about 100 cm. Thus, a marker strip with a radius of curvature less than about 100 cm is selected in embodiments of the present invention. Another limiting factor for the strip's curvature arises from the industry's accepted marker tag height, which is about 1.6 mm. This marker height must accommodate the marker strip height h indicated in FIG. 1A and the thickness of a bias magnet 12 of FIG. 1A in addition to the thickness of tag's outer casing, resulting in a maximum marker strip height h of about 0.9 mm which corresponds to a radius of curvature of about 20 cm for the marker strip. Thus, an overall radius of curvature for a marker strip in accordance with embodiments of the present invention is between about 20 cm and about 100 cm.

Figure 5:
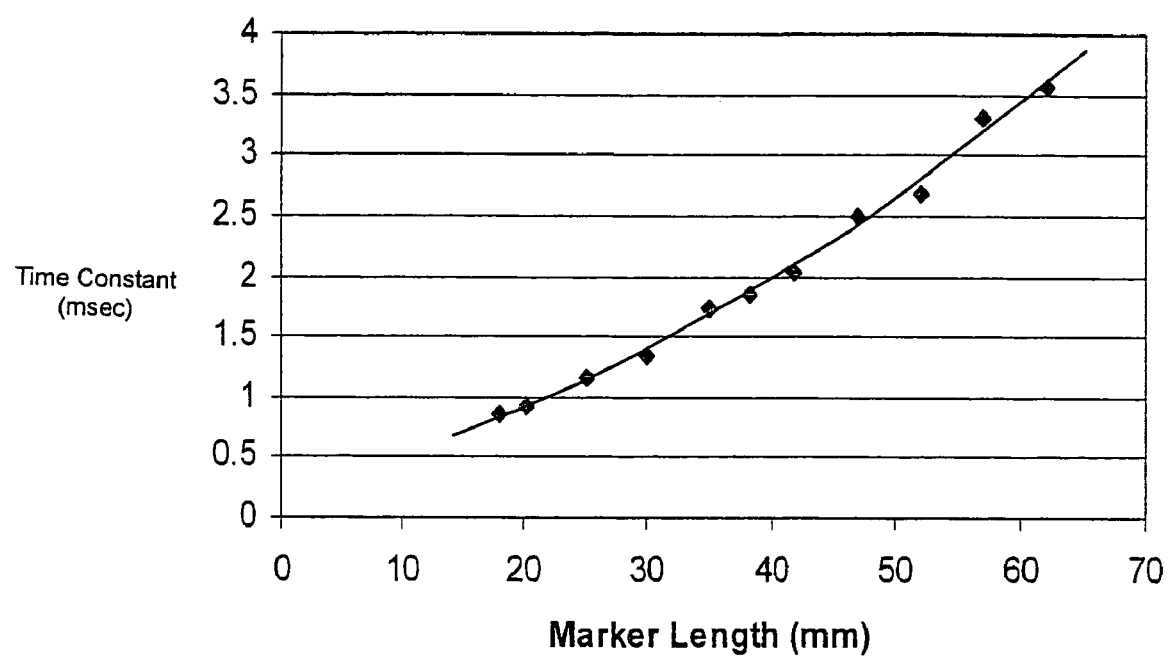
FIG. 5 illustrates characteristic time constant for magnetomechanical resonance signal decay as a function of the length of a marker strip of an embodiment of the present invention.

Furthermore, ribbons slit to about 6 mm wide width in accordance with the Example 1 were cut into strips with different lengths, and their magnetomechanical resonance properties were examined. In addition to the properties covered in Tables I, II and IV above, a complementary test to determine the effectiveness of a magnetomechanical resonance strip was performed using the following formula:

$$V(t) = V_0 \exp(-t/\tau), \quad (2)$$

wherein t is the time measured after termination of an AC field excitation and $\tau$ is a characteristic time constant for the resonance signal decay. The values of $V_{1max}$ in Tables I, II and IV was determined from the data for t=1 msec. The results are given in Table V, in which other parameters characterizing the resonance properties of differing strip lengths are summarized. It is noted that $f_r$ follows the relationship of Equation (1) given above, quite well. Also noted is the increase of $\tau$ with increasing strip length, as shown in FIG. 5. FIG. 5 indicates that the characteristic time constant $\tau$ increases from about 0.7 msec for a marker length l of about 15 mm to about 3.9 msec for l of about 65 mm. A larger value of the time constant $\tau$ is selected if a delayed signal detection is desired. Furthermore, additional magnetomechanical resonance characteristics were determined for marker strips of an embodiment of the present invention with different lengths, l and the results are summarized in Table V. The width and thickness of each strip were about 6 mm and about 28 μm, respectively. The resonance frequency, $f_r$ and time constant, $\tau$ are defined in Equations (1) and (2), respectively. The definitions of $V_{0\ max}$, $H_{b0}$, $V_{1\ max}$, $H_{b1}$ and $df_r/dH_b$ were the same as in Table 1. Marker height h is defined in FIG. 1, and a radius of curvature each strip was calculated using h and l. Table V indicates that a marker strip of an embodiment of the present invention provides opportunities for a wide variety of electronic article identification systems utilizing different resonance frequencies.

Figure 6:
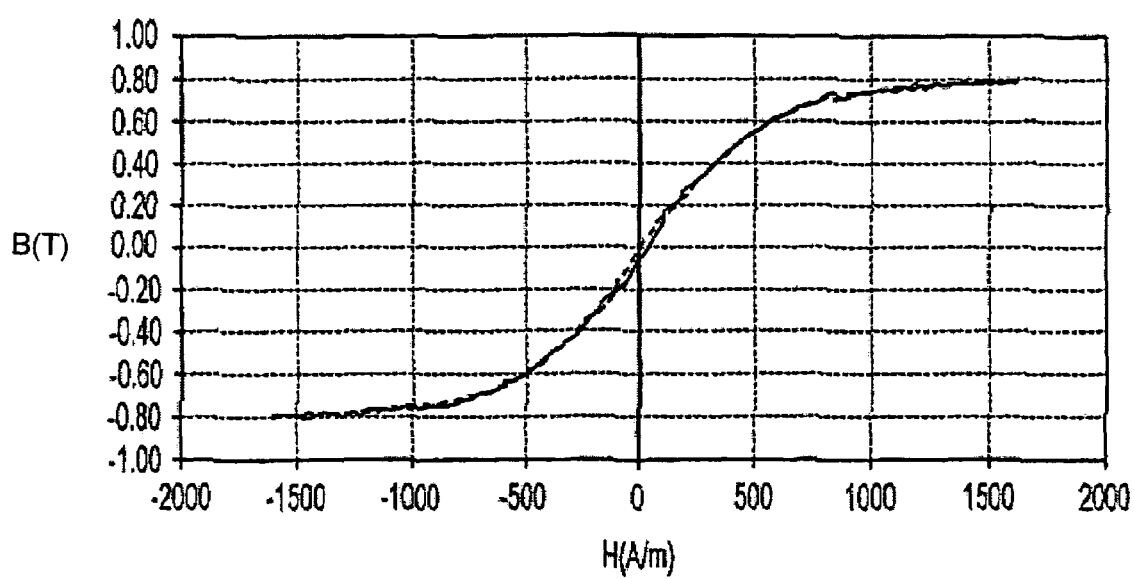
FIG. 6 illustrates a BH loop taken at 60 Hz on a marker strip of an embodiment of the present invention having a length of approximately 38 mm, a width of approximately 6 mm and a thickness of about 28 μm.

In addition to the basic magnetic properties such as saturation magnetic induction and magnetostriction listed in Table III that are required to generate magnetomechanical resonance in a marker strip of an embodiment of the present invention, the direction of magnetic anisotropy which is the direction of easy magnetization in a marker strip must be essentially perpendicular to the strip's length direction. This is indeed the case, as indicated in FIG. 6 which depicts a BH loop taken at 60 Hz using a measurement method of Example 3 on an approximately 38 mm long strip from Table V above. The BH loop of FIG. 6 indicates that the remanent magnetic induction at H=0, i.e. B(H=0) is close to zero and the permeability defined by B/H near H=0 is linear. The shape of the BH loop shown in FIG. 6 is typical or characteristic of the BH behavior of a magnetic strip in which the average direction of the magnetic anisotropy is perpendicular to strip's length direction. A consequence of the magnetization behavior of a marker strip of an embodiment of the present invention shown in FIG. 6 is the absence of higher harmonics generation in the strip when the strip is placed in an AC magnetic field. Thus the system "pollution problem" as mentioned in the "Background of the Invention" section, is minimized. To further check this point, a higher harmonic signal from the marker strip of FIG. 6 was compared with that of a marker strip of an electronic article surveillance system based on magnetic harmonic generation/detection. The results of this comparison are given in Table VI below.

As shown in Table VI, a magnetic higher harmonics signal comparison was made between a marker strip of an embodiment of the present invention and a marker strip based on Co-based METGLAS®2714A alloy, which is widely used in an electronic article surveillance system based on a magnetic harmonic generation/detection system. The strip size was the same for both cases and was approximately 38 mm long and approximately 6 mm wide. The fundamental excitation frequency was 2.4 kHz and the $25^{th}$ harmonic signals were compared by using a harmonic signal detection method of Example 4.

TABLE VI

| Marker Type | $25^{th}$ Harmonic Signal (mV) |
|---|---|
| Present Invention | 4 |
| Harmonic Marker | 40 |

TABLE V

| Strip Length/ (mm) | $f_r$ (Hz) | $V_{0\ max}$ (mV) | $H_{b0}$ (A/m) | Time Constant $\tau$ (msec) | $V_{1\ max}$ (mV) | $H_{b1}$ (A/m) | $df_r/dH_b$ [Hz/(A/m)] | Radius of Curvature (cm) |
|---|---|---|---|---|---|---|---|---|
| 18.01 | 120,772 | 73 | 610 | 0.85 | 23 | 520 | 6.65 | 26 |
| 20.16 | 108,536 | 68 | 550 | 0.92 | 25 | 370 | 8.07 | 22 |
| 24.99 | 87,406 | 94 | 460 | 1.16 | 42 | 338 | 6.55 | 22 |
| 30.02 | 72,284 | 135 | 461 | 1.35 | 69 | 342 | 9.44 | 36 |
| 35.03 | 61,818 | 143 | 387 | 1.74 | 79 | 322 | 8.73 | 29 |
| 37.95 | 56,782 | 160 | 389 | 1.86 | 91 | 337 | 7.89 | 31 |
| 41.90 | 51,336 | 184 | 389 | 2.03 | 109 | 350 | 6.67 | 43 |
| 46.95 | 45,992 | 178 | 330 | 2.49 | 116 | 320 | 5.21 | 45 |
| 52.12 | 41,438 | 197 | 331 | 2.69 | 132 | 312 | 5.28 | 35 |
| 56.99 | 37,900 | 187 | 292 | 3.30 | 135 | 291 | 5.93 | 37 |
| 62.07 | 34,864 | 197 | 293 | 3.56 | 148 | 279 | 4.94 | 34 |

As Table VI indicates, a negligibly small harmonic signal from a marker of an embodiment of the present invention does not trigger an electronic article surveillance system based on magnetic harmonic generation/detection.

Figure 7A:
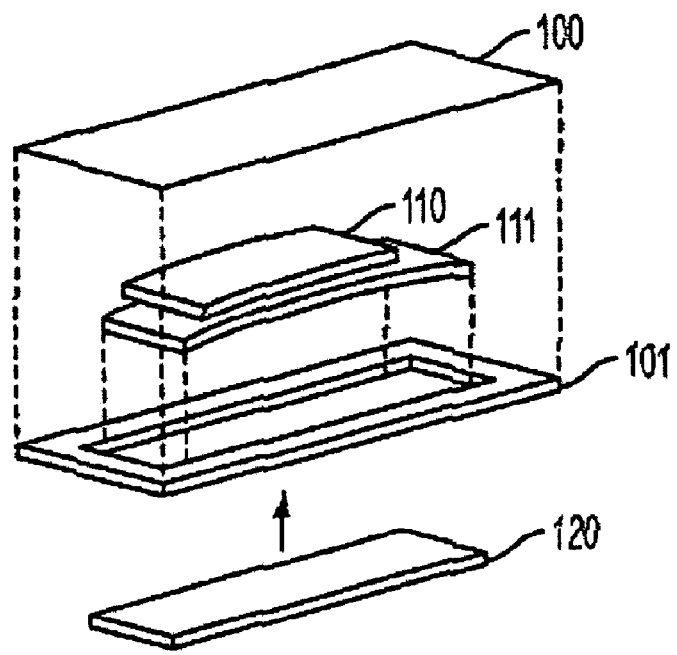
FIG. 7A illustrates a comparison of a physical profile of an embodiment of a magnetomechanical resonant marker in accordance with embodiments of the present invention.

Two marker-strips of an embodiment of the present invention with different lengths were selected randomly from a number of strips as characterized in Tables I, II, IV and V and were mounted on top of each other, and a marker was made as indicated by strip 110 and strip 111 in FIG. 7A. The two marker-strips with different lengths are housed in a hollow area between non-magnetic outside casing 100 and 101. A bias magnet 120 is attached on the outside surface of a casing 101. For comparison, a marker configuration for two conventional marker-strips is shown by strip 210 and strip 211 in FIG. 7B, in which a planar area available for the two strips is the same as that for the two strips of FIG. 7A.

Figure 7B:
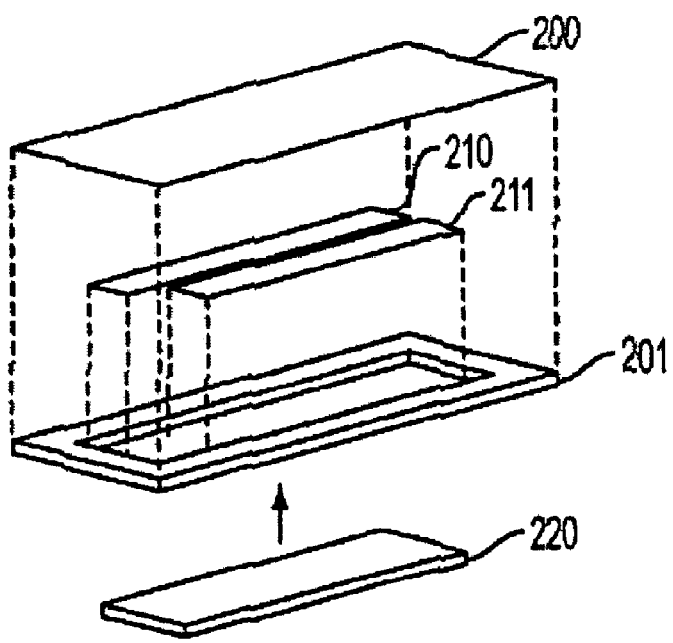
FIG. 7B illustrates a comparison of a conventional marker, utilizing two marker-strips with different lengths in both cases.

Numerals 200, 201 and 220 in FIG. 7B correspond functionally to items 100, 101 and 120 in FIG. 7A, respectively.

Figure 8A:
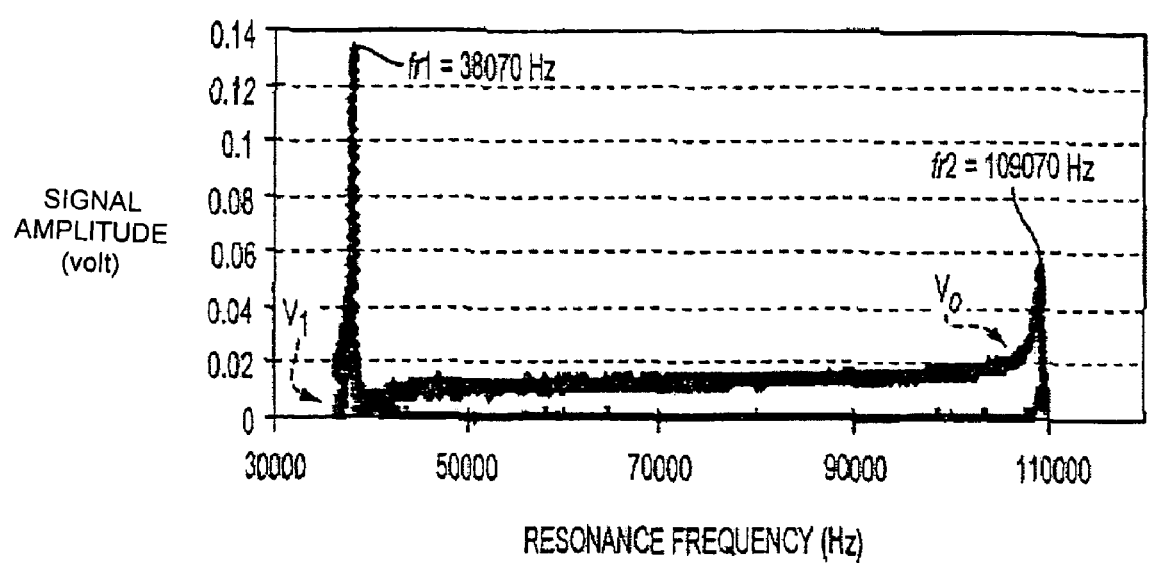
FIG. 8A illustrates magnetomechanical resonance characteristics of a marker having two strips with different lengths of an embodiment of the present invention.
Figure 8B:
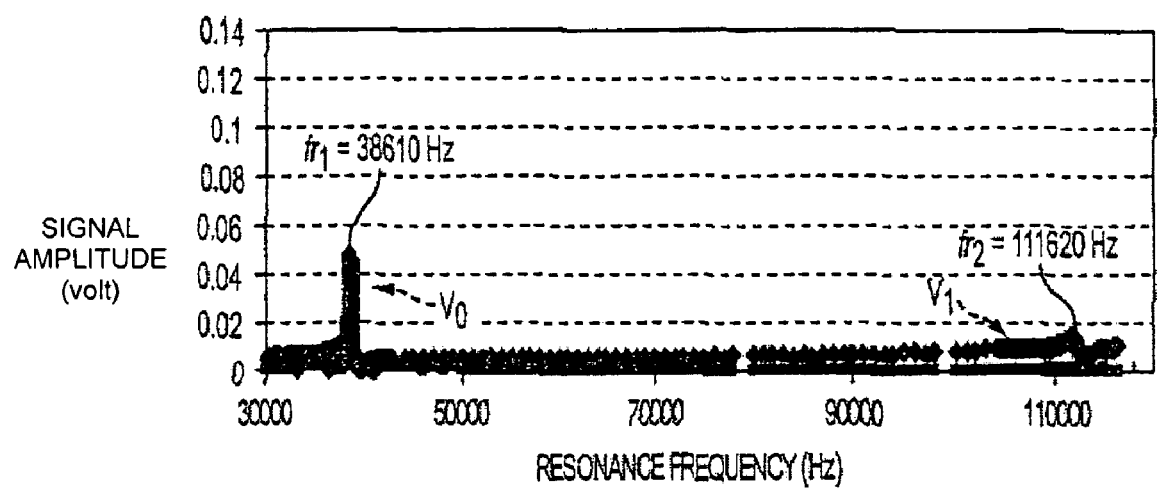
FIG. 8B illustrates magnetomechanical resonance characteristics of a conventional marker having two strips with different lengths.
Figure 9:
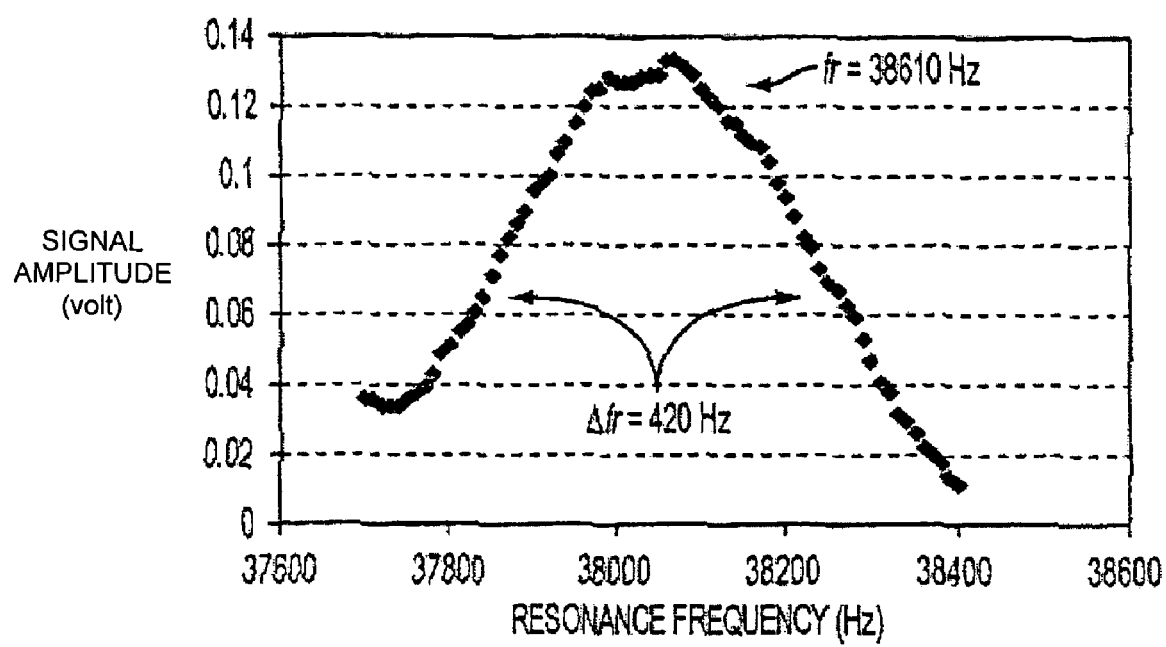
FIG. 9 illustrates a resonance signal profile near the lower resonance frequency region of FIG. 8A.
Figure 10:
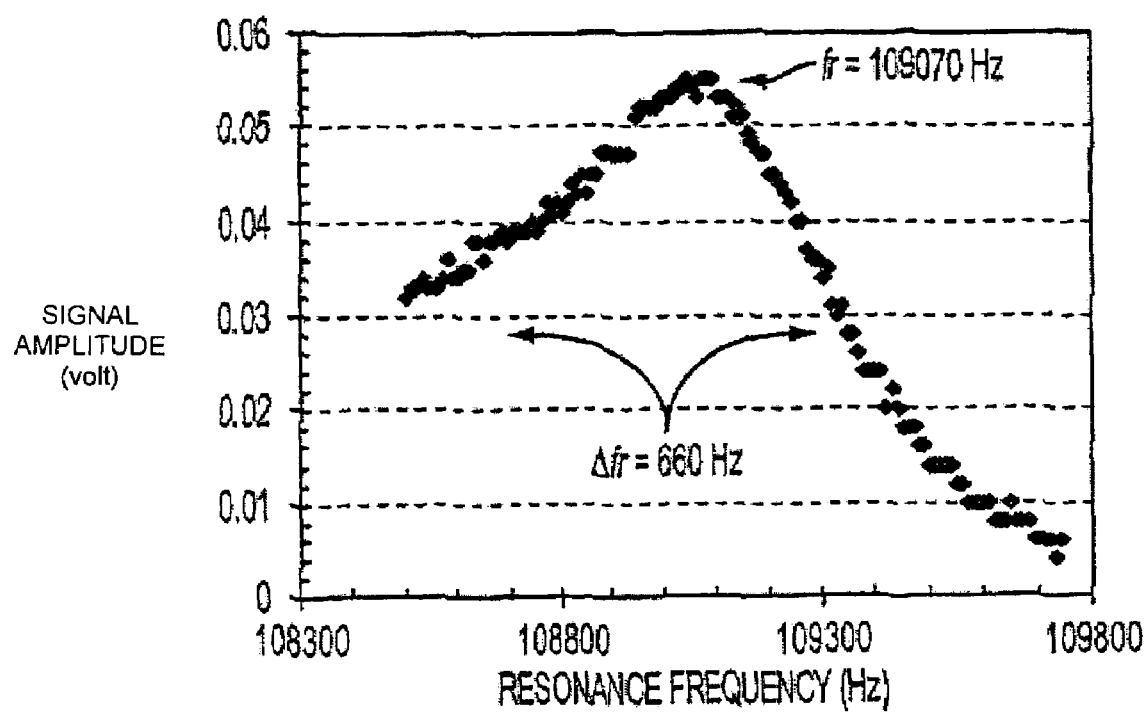
FIG. 10 illustrates a resonance signal profile near the upper resonance frequency region of FIG. 8A.

The magnetomechanical resonance behavior of a two-strip marker of an embodiment of the present invention corresponding to FIG. 7A is shown in FIG. 8A for a marker containing an approximately 20 mm long strip and an approximately 57 mm long strip from Table V, and the magnetomechanical resonance behavior of a conventional two-strip marker prepared in accordance with the '490 patent, which corresponds to FIG. 7B, is shown in FIG. 8B using two strips with lengths of approximately 20 mm and approximately 57 mm. It is clear from FIGS. 8A-8B that overall signal amplitudes from the two marker-strips of an embodiment of the present invention are considerably higher than the overall signal amplitudes from the two conventional marker-strips. For the case of a marker of an embodiment of the present invention illustrated in FIG. 7A, the signal amplitude $V_0$ (illustrated in FIG. 8A) from the longer sized strip of an embodiment of the present invention is about 280% higher than its corresponding value $V_0$ (illustrated in FIG. 8B) for the longer sized conventional marker strip of FIG. 7B. For the shorter sized strip, the strip of an embodiment of the present invention generates a higher signal amplitude $V_1$ (illustrated in FIG. 8A) by 370% than the signal amplitude $V_1$ (illustrated in FIG. 8B) of its corresponding conventional marker strip. An enlarged resonance amplitude profile near the lower resonance frequency, $f_r$=38,610 Hz shown in FIG. 8A, is depicted in FIG. 9, which shows the width of the magnetomechanical resonance, defined as the width in frequency at the point where the amplitude becomes ½ that of the peak amplitude, is about 420 Hz. For the upper resonance frequency region near $f_r$=109,070 Hz, the signal amplitude has a frequency width of about 660 Hz as shown in FIG. 10. This frequency width, hereinafter termed resonance line width, is used to determine the minimum resonance frequency separation between the two adjacent resonance frequencies for two marker strips with slightly different lengths.

Figure 12:
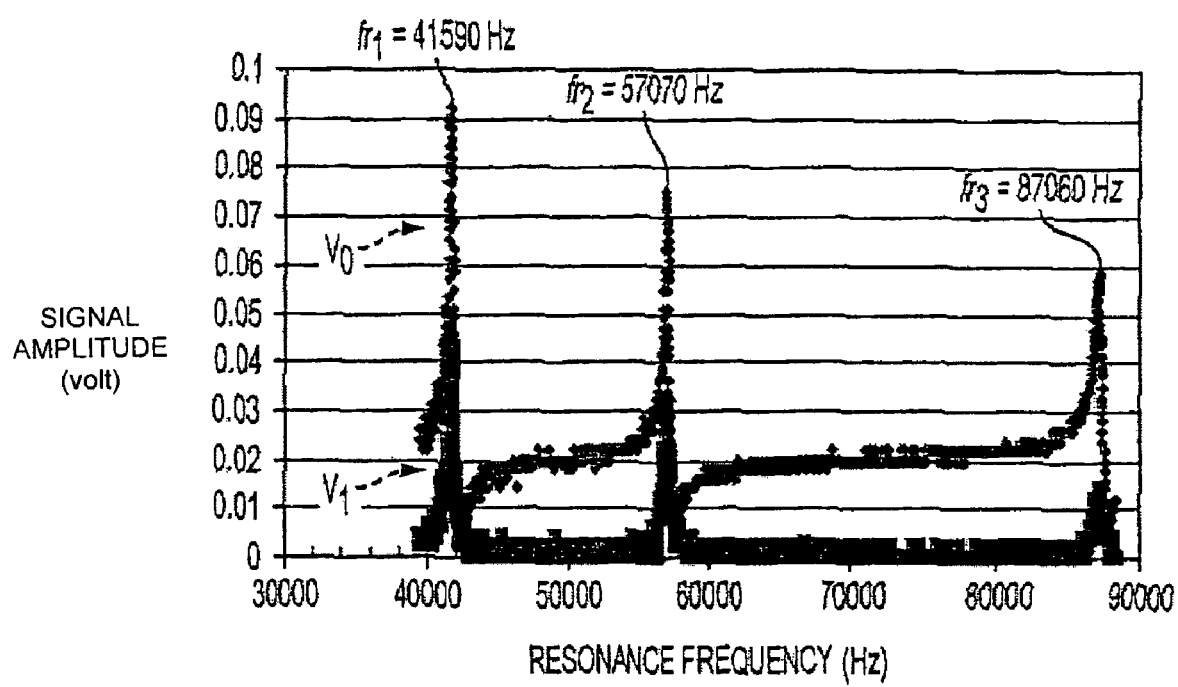
FIG. 12 illustrates magnetomechanical resonance characteristics of a marker having three strips with different lengths of an embodiment of the present invention.
Figure 13:
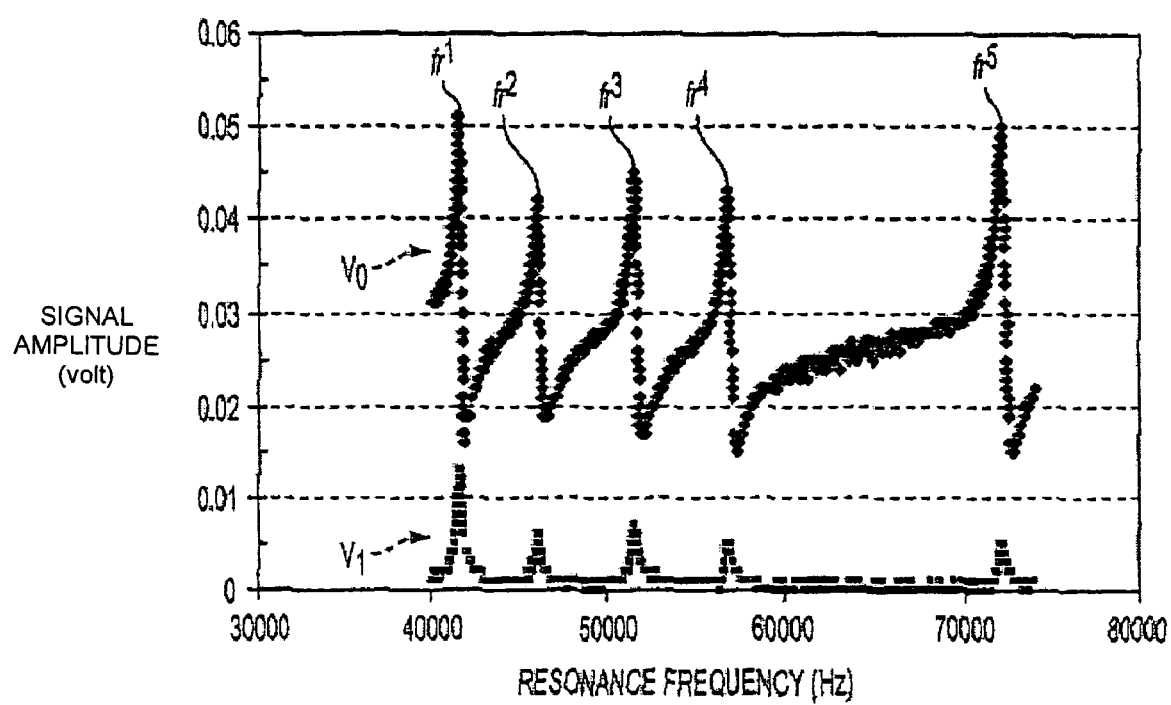
FIG. 13 illustrates magnetomechanical resonance characteristics of a marker having five strips with different lengths of an embodiment of the present invention.

FIG. 11A illustrates a marker of an embodiment of the present invention which contains three marker-strips, 311, 312 and 313, with different lengths which were randomly selected from Tables I, II and IV above. The cavity space 302 between the two outside casings 300 and 301 is to accommodate the marker strips, 311, 312 and 313, of the embodiment of the present invention, and numeral 330 indicates a bias magnet which is attached on the outside surface of casing 301. The magnetomechanical resonance characteristics of the marker with three strips having lengths of about 25 mm, about 38 mm and about 52 mm and a width of about 6 mm are shown in FIG. 12. It noted in FIG. 8A and FIG. 9 that the mechanical resonance observed is sharp, with a resonance line width of about 400 Hz near the lower resonance frequency region of about 40,000 Hz, and with a resonance line width of about 700 Hz near the higher resonance frequency region of about 110,000 Hz, as is indicated in FIG. 8A and FIG. 10, indicating that the magnetomechanical interference between marker strips with different lengths in a marker of an embodiment of the present invention is insignificant, which in turn allows stacking more marker-strips than three. The lack of strip-to-strip magnetomechanical interference is evident in FIG. 11B, as the three marker strips with different lengths touch among themselves along a line near the center in the strips' width direction. Similarly five strips with different lengths of about 30 mm, about 38 mm, about 42 mm, about 47 mm and about 52 mm and with a width of about 6 mm were selected from strips of Tables I, II, IV and V, and a marker was fabricated. The resonance characteristics of this 5-strip marker are shown in FIG. 13. A summary of resonance characteristics for markers of an embodiment of the present invention utilizing different length marker strips is given in Table VII.

As shown in Table VII, resonance signals $V_{0\ max}$ and $V_{1\ max}$ are located at respective resonance frequencies $f_r$ from coded markers of the present invention.

TABLE VII

| Marker Sample | $V_{0\ max}$ (mV) | $V_{1\ max}$ (mV) | Strip Length (mm) |
|---|---|---|---|
| No. 1 (bias = 461 A/m) | | | |
| $f_{r1}$ = 51,300 | 92 | 43 | 42 |
| $f_{r2}$ = 61,250 | 104 | 48 | 35 |
| No. 2 (bias = 301 A/m) | | | |
| $f_{r1}$ = 38,070 | 133 | 90 | 57 |
| $f_{r1}$ = 109,070 | 55 | 10 | 20 |
| No. 3 (bias = 360 A/m) | | | |
| $f_{r1}$ = 37,880 | 100 | 57 | 57 |
| $f_{r2}$ = 57,260 | 69 | 24 | 38 |
| $f_{r3}$ = 108,440 | 45 | 3 | 20 |
| No. 4 (bias = 420 A/m) | | | |
| $f_{r1}$ = 46,100 | 65 | 28 | 47 |
| $f_{r2}$ = 57,100 | 53 | 24 | 38 |
| $f_{r3}$ = 72,720 | 61 | 14 | 30 |
| No. 5 (bias = 399 A/m) | | | |
| $f_{r1}$ = 41,590 | 92 | 47 | 52 |
| $f_{r2}$ = 57,070 | 75 | 3 | 38 |
| $f_{r3}$ = 87,060 | 59 | 12 | 25 |
| No. 6 (bias = 490 A/m) | | | |
| $f_{r1}$ = 37,640 | 61 | 20 | 57 |
| $f_{r2}$ = 45,740 | 55 | 12 | 47 |
| $f_{r3}$ = 56,680 | 68 | 21 | 38 |
| $f_{r4}$ = 86,280 | 48 | 4 | 25 |
| No. 7 (bias = 550 A/m) | | | |
| $f_{r1}$ = 41,440 | 51 | 12 | 52 |
| $f_{r2}$ = 45,930 | 42 | 5 | 47 |
| $f_{r3}$ = 51,510 | 45 | 6 | 42 |
| $f_{r4}$ = 56,770 | 42 | 5 | 38 |
| $f_{r5}$ = 72,080 | 50 | 4 | 30 |

In Table VII, marker strip width and thickness are about 6 mm and about 28 μm, respectively.

The resonance signals $V_{0\ max}$ and $V_{1\ max}$ given in Table VII are significant enough to be detected in an electronic article identification system in accordance with embodiments of the present invention. The data in Table V leads to a relationship between resonance frequency, $f_r$, and strip length, which is given by $$f_r = 2.1906 \times 10^6 / l\ (Hz),$$

where l is the strip length in mm. Using this relationship which is consistent with Equation (1), the variability of the resonance frequency caused by the tolerance in cutting ribbon to a predetermined length is determined as follows. The above relationship between $f_r$ and l leads to $\Delta f_r/\Delta l = -2.906 \times 10^6 / 2l^2$, where $\Delta f_r$ is a change in the resonance frequency due to a variation in the strip length, $\Delta l$. The marker strip cutting tolerance achievable with a commercially available ribbon cutter is determined by comparing the nominal or targeted strip length and the actual length given in Table V. For example, the strip having a length of 18.01 mm in Table V had a targeted strip length of 18 mm, resulting in a cutting tolerance of 0.01 mm. Using the cutting machine tolerance thus obtained, the frequency variability $\Delta f_r$ due to strip length variability was calculated, which ranged from about 3 Hz for shorter strips to about 400 Hz for longer strips. Since the resonance line width for a longer strip is about 400 Hz, as indicated in FIG. 8 and is about 700 Hz for a shorter strip, as indicated in FIG. 9, the minimum frequency separation which is discernable in an electronic article identification system in accordance with embodiments of the present invention is determined as about 800 Hz. Thus, to assure no false identification, a resonance frequency separation of 2 kHz, which is more than twice that of the minimum discernable resonance frequency separation, was selected to determine the number of identifiable articles in a selected universe. The resonance frequency covered with the marker strips listed in Table V ranged from about 34,000 Hz to about 120,000 Hz, covering a resonance frequency span of approximately 86,000 Hz. Using a resonance frequency separation of 2 kHz for non-false identification, as determined above, the number of electronically identifiable articles becomes 115.5 million in a given universe when a marker with five marker strips with different lengths of an embodiment of the present invention is utilized in a coded electronic article identification system in accordance with the present invention. The number of the identifiable or coded articles is further increased by either adding more marker strips and/or changing the level of bias field in a marker.

Figure 14:
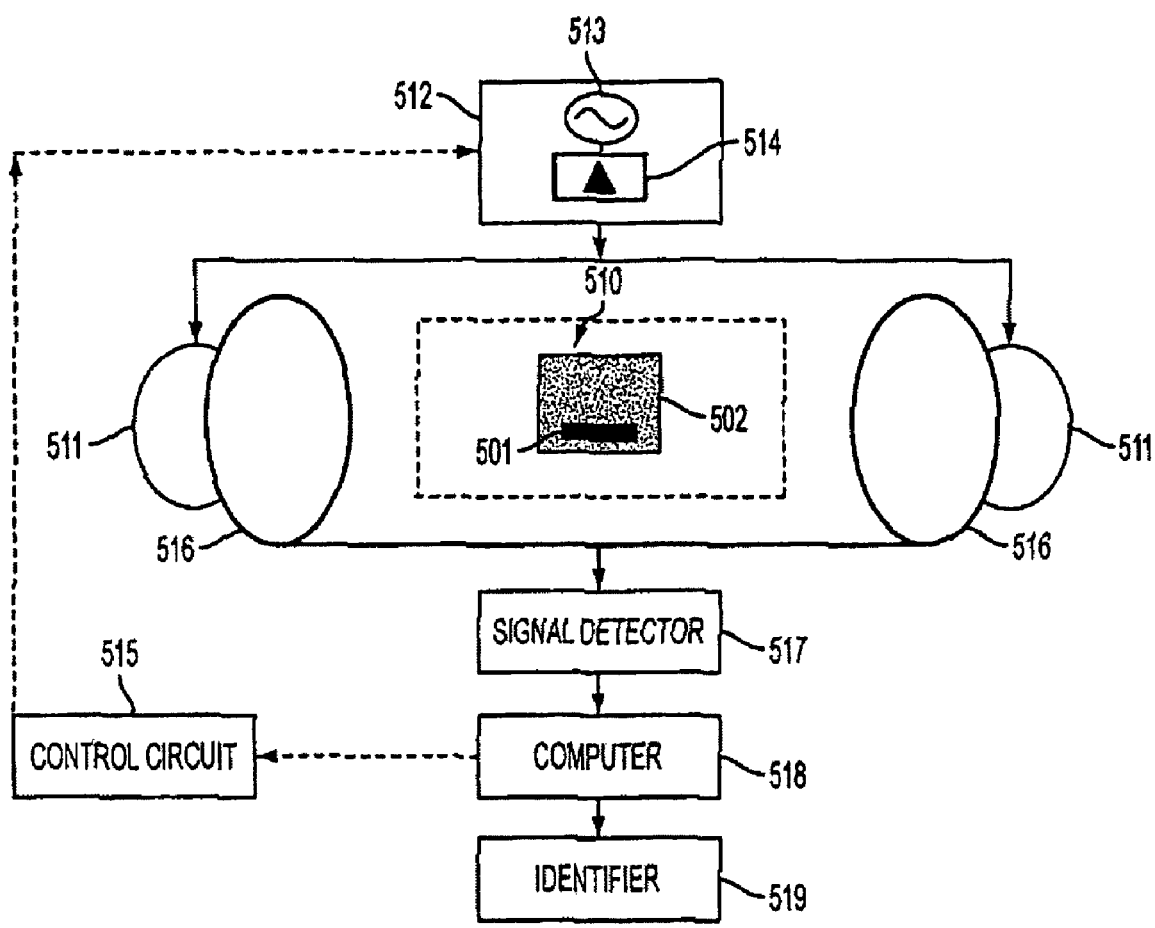
FIG. 14 illustrates a coded electronic article identification system in accordance with an embodiment of the present invention.

A coded marker 501 as described above is effectively utilized in an electronic article identification system in accordance with embodiments of the present invention, as is illustrated in FIG. 14. An article to be identified 502 carrying a coded marker 501 of an embodiment of the present invention is placed in an interrogation zone 510 in FIG. 14, which is flanked by a pair of interrogation coils 511. The coils 511 emit an AC magnetic field fed by an electronic device 512 consisting of a signal generator 513 and an AC amplifier 514 with varying frequencies, which is controlled by an electronic circuit box 515 for its on-off operation, aiming at the article 502 to be identified. When the article 502 is placed in zone 510, the electronic circuit box 515 switches on the interrogation AC field frequency sweeping from the lowest frequency to the highest frequency, the range of which depends on the marker's predetermined frequency range. In such a frequency sweep, a resonance signal from a coded marker of an embodiment of the present invention 501 is detected in a pair of signal receiving coils 516, resulting in a resonance signal profile as exemplified in FIG. 13. The signal profile thus obtained by means of a signal detector 517 is stored in a computer 518 which is programmed to identify the resonance frequency sequences encoded in a coded marker 501 of an embodiment of the present invention. When this identification is complete, the computer 518 sends signal reporting results of the identification to an identifier 519 and to the electronic circuit box 515 for resetting the system. If so desired, a coded marker in accordance with embodiments of the present invention may be deactivated by demagnetizing the bias magnet in the marker after article 502 exits the interrogation zone 510.

The coded electronic article identification system provided above is used to identify an article by sweeping an AC excitation field with varying frequency. In certain cases, delayed identification is desired, which can be accomplished by tracking $V_1$ as depicted in FIG. 3, FIG. 8A, FIG. 12 and FIG. 13. Electronically this is accomplished by programming the computer 517 in FIG. 14 to process $V_1$ as a function of the sweeping frequency.

EXAMPLE 1

A slit ribbon was cut into ductile and rectangular strips with a conventional metal ribbon cutter. The curvature of each strip was determined optically by measuring the height, h, of the curved surface over the strip length, l, as defined in FIG. 1A.

EXAMPLE 2

The magnetomechanical performance was determined in a set-up in which a pair of coils supplying a static bias field and the voltage appearing in a signal detecting coil compensated by a bucking coil was measured by a voltmeter and an oscilloscope. The measured voltage therefore is detecting-coil dependent and indicates a relative signal amplitude. The exciting AC field was supplied by a commercially available function generator and an AC amplifier. The signal voltage from the voltmeter was tabulated and a commercially available computer software was used to analyze and process the data collected.

EXAMPLE 3

A commercially available DC BH loop measurement equipment was utilized to measure magnetic induction B as a function of applied field H. For an AC BH loop measurement, an exciting coil-detecting coil assembly similar to that of Example 4 was used and output signal from the detecting coil was fed into an electronic integrator. The integrated signal was then calibrated to give the value of the magnetic induction B of a sample. The resultant B was plotted against applied field H, resulting in an AC BH loop. Both AC and DC cases, the direction of the applied field and the measurement was along marker strips' length direction.

EXAMPLE 4

A marker strip prepared in accordance with Example 1 was placed in an exciting AC field at a predetermined fundamental frequency and its higher harmonics response was detected by a coil containing the strip. The exciting coil and signal detecting coil were wound on a bobbin with a diameter of about 50 mm. The number of the windings in the exciting coil and the signal detecting coil was about 180 and about 250, respectively. The fundamental frequency was chosen at 2.4 kHz and its voltage at the exciting coil was about 80 mV. The 25th harmonic voltages from the signal detecting coil were measured.

Thus, in an embodiment of the present invention, a radius of curvature of the marker strip curvatures may be less than 120 cm, or may be selected between about 20 cm and about 100 cm.

Where selected, encoding is carried out by cutting an amorphous magnetostrictrive alloy ribbon having its magnetic anisotropy direction perpendicular to ribbon axis to a rectangular strip with a predetermined length having a length-to-width ratio greater than 3.

Where selected, the strips have characteristic time constants for magnetomechanical resonance signal decay ranging from about 0.7 msec to about 3.9 msec.

Also, where selected, the strips have a strip width ranging from about 3 mm to about 15 mm.

In an embodiment of the present invention, the strips have a slope of resonance frequency versus bias field ranging from about 4 Hz/(A/m) to about 14 Hz/(A/m).

Where selected, the strips have a length greater than about 18 mm when a strip width is 6 mm.

Also, where selected, the strips have a magnetomechanical resonance frequency less than about 120,000 Hz.

In an embodiment of the present invention, the amorphous ferromagnetic alloy ribbons have a saturation magnetostriction between 6 ppm and 18 ppm and a saturation induction between 0.6 tesla and 1.1 tesla.

Where selected, the amorphous ferromagnetic alloy ribbons have characteristic BH loops with near-zero remanent magnetic inductions at zero-applied magnetic field.

In an embodiment of the present invention, the coded marker comprises at least two marker-strips with different lengths. Where selected, the coded marker comprises five marker-strips with different lengths.

In an embodiment of the present invention, the coded marker has a magnetomechanical resonance frequency between about 30,000 and about 130,000 Hz.

In an embodiment of the present invention, the coded marker has an electronic identification universe containing more than 115 million separately identifiable articles.

Thus, in an embodiment of the present invention, a coded marker of a magnetomechanical resonant electronic article identification system, adapted to resonate mechanically at preselected frequencies, comprises a plurality of ductile magnetostrictive strips cut to predetermined lengths from amorphous ferromagnetic alloy ribbons that have curvatures along a ribbon length direction and exhibit magnetomechanical resonance under alternating magnetic field excitations with a static bias field, the strips having a magnetic anisotropy direction perpendicular to a ribbon axis, wherein at least two of the strips are adapted to be magnetically biased to resonate at a single, different one of the preselected frequencies.

In addition, in selected embodiments of the present invention, an electronic article identification system has a capability of decoding coded information of a coded marker. The coded marker is adapted to resonate mechanically at preselected frequencies, and the coded marker comprises a plurality of ductile magnetostrictive strips cut to predetermined lengths from amorphous ferromagnetic alloy ribbons that have curvatures along a ribbon length direction and exhibit magnetomechanical resonance under alternating magnetic field excitations with a static bias field, the strips having a magnetic anisotropy direction perpendicular to a ribbon axis, and wherein at least two of the strips are adapted to be magnetically biased to resonate at a single, different one of the preselected frequencies. The electronic article identification system comprises one of: a pair of coils emitting an AC excitation field aimed at the coded marker to form an interrogation zone; a pair of signal detection coils receiving coded information from the coded marker; an electronic signal processing device with an electronic computer with a software to decode information coded on the coded marker; or an electronic device identifying the coded marker. Thus, as well as providing identification of a coded marker, the electronic article identification system may identify an article having the coded marker attached thereto.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A coded marker of a magnetomechanical resonant electronic article identification system, adapted to resonate mechanically at preselected frequencies, comprising: a plurality of ductile magnetostrictive strips cut to predetermined lengths from amorphous ferromagnetic alloy ribbons that have curvatures along a ribbon length direction and exhibit magnetomechanical resonance under alternating magnetic field excitations with a static bias field, the strips having a magnetic anisotropy direction perpendicular to a ribbon axis, wherein each of at least two of the strips resonates at a different preselected frequency.

2. The coded marker of claim 1, wherein a radius of curvature of the marker strip is less than 120 cm.

3. The coded marker of claim 2, wherein a radius of curvature of the marker strip is between about 20 cm and about 100 cm.

4. The coded marker of claim 1, wherein the marker strip has a characteristic BH loop with near-zero remanent magnetic induction at zero-applied magnetic field.

5. The coded marker of claim 1, wherein encoding is carried out by cutting an amorphous magnetostrictrive alloy ribbon having its magnetic anisotropy direction perpendicular to the ribbon axis to a rectangular strip with a predetermined length having a length-to-width ratio greater than 3.

6. The coded marker of claim 5, wherein the rectangular amorphous magnetostrictive alloy strip has a characteristic time constant for magnetomechanical resonance signal decay ranging from about 0.7 msec to about 3.9 msec.

7. The coded marker of claim 5, wherein the strips have a strip width ranging from about 3 mm to about 15 mm.

8. The coded marker of claim 5, wherein the strips have a slope of resonance frequency versus bias field ranging from about 4 Hz/(A/m) to about 14 Hz/(A/m).

9. The coded marker of claim 5, wherein the strips have a length greater than about 18 mm when a strip width is 6 mm.

10. The coded marker of claim 9, wherein the strips have a magnetomechanical resonance frequency less than about 120,000 Hz.

11. The coded marker of claim 1, wherein the amorphous ferromagnetic alloy ribbons have a saturation magnetostriction between 6 ppm and 18 ppm and a saturation induction between 0.6 tesla and 1.1 tesla.

12. The coded marker of claim 11, wherein an amorphous ferromagnetic alloy of the amorphous ferromagnetic alloy ribbons has a composition based on $Fe_a$—$Ni_b$—$Mo_c$—$B_d$ with $30 \leq a \leq 43$, $35 \leq b \leq 48$, $0 \leq c \leq 5$, $14 \leq d \leq 20$ and a+b+c+d=100, up to 3 atom % of MO being optionally replaced by Co, Cr, Mn and/or Nb and up to 1.5 atom % of B being optionally replaced by Si and/or C.

13. The coded marker of claim 12, wherein an amorphous ferromagnetic alloy of the amorphous ferromagnetic alloy ribbons has a composition of one of: $Fe_{41.7} Ni_{39.4} Mo_{3.1} B_{15.8}$, $Fe_{41.5} Ni_{38.9} Mo_{4.1} B_{15.5}$, $Fe_{39.8} Ni_{39.2} Mo_{3.1} B_{17.6} C_{0.3}$, $Fe_{40.2} Ni_{39.0} Mo_{3.6} B_{16.6} Si_{0.6}$, $Fe_{36.5} Ni_{42.9} Mo_{4.2} B_{16.5}$, $Fe_{40.6} Ni_{40.1} Mo_{3.7} B_{15.1} S_{10.5}$, $Fe_{39.6} Ni_{38.3} Mo_{4.1} B_{18.0}$, $Fe_{38.0} Ni_{38.8} Mo_{3.9} B_{19.3}$, $Fe_{36.9} Ni_{41.3} Mo_{4.1} B_{17.8}$, $Fe_{36.7} Ni_{41.9} Mo_{4.0} B_{16.6} Si_{0.8}$, $Fe_{35.6} Ni_{42.6} Mo_{4.0} B_{17.9}$, $Fe_{34.7} Ni_{43.5} Mo_{4.0} B_{17.8}$, $Fe_{33.3} Ni_{43.8} Mo_{3.9} Co_{0.2} Cr_{0.1} B_{17.7} Si_{10}$, or $Fe_{32.5} Ni_{44.7} Mo_{3.7} Co_{0.1} Cr_{0.2} B_{18.0} Si_{0.8}$.

14. A coded marker of claim 1, wherein the coded marker comprises at least two marker-strips with different lengths.

15. A coded marker of claim 14, wherein the coded marker comprises five marker-strips with different lengths.

16. A coded marker of claim 14, wherein the coded marker has a magnetomechanical resonance frequency between about 30,000 and about 130,000 Hz.

17. A coded marker of claim 16, wherein the coded marker has an electronic identification universe containing more than 115 million separately identifiable articles.

18. A coded marker of claim 16, wherein the coded marker has an electronic identification universe containing up to about 1800 separately identifiable articles for a coded marker with two marker strips and about 115 million separately identifiable articles for a coded marker with five marker strips.

19. A coded marker of claim 14, wherein the coded marker comprises three marker-strips with different lengths.

20. A coded marker of claim 14, wherein the coded marker comprises four marker-strips with different lengths.

21. The coded marker of claim 1, wherein a radius of curvature of the marker strip curvatures is between about 20 cm and about 100 cm.

22. An electronic article identification system having a capability of decoding coded information of a coded marker, the system comprising one of:

a pair of coils emitting an AC excitation field with varying frequency aimed at the coded marker to form an interrogation zone;

a pair of signal detection coils receiving coded information from the coded marker;

an electronic signal processing device with an electronic computer with a software to decode information coded on the coded marker; or an electronic device identifying the coded marker, wherein the coded marker is adapted to resonate mechanically at preselected frequencies, wherein the coded marker comprises a plurality of ductile magnetostrictive strips cut to predetermined lengths from amorphous ferromagnetic alloy ribbons that have curvatures along a ribbon length direction and exhibit magnetomechanical resonance under alternating magnetic field excitations with a static bias field, the strips having a magnetic anisotropy direction perpendicular to a ribbon axis, and wherein each of at least two of the strips resonates at a different preselected frequency.

* * * * *

UNITED STATES PATENT AND TRADEMARK OFFICE
CERTIFICATE OF CORRECTION

PATENT NO. : 7,320,433 B2
APPLICATION NO. : 11/607993
DATED : January 22, 2008
INVENTOR(S) : Ryusuke Hasegawa Page 1 of 1

It is certified that error appears in the above-identified patent and that said Letters Patent is hereby corrected as shown below:

First Page, Column 2 (Other Publications), Line 20, change "Inc.." to --Inc.--.

Column 18, Line 22, change "magnetostrictrive" to --magnetostrictive--.

Column 18, Line 49, change "MO" to --Mo--.

Column 18, Line 57, change "$S_{10.5}$," to --$Si_{0.5}$,--.

Column 18, Line 60, change "$Si_{10}$," to --$Si_{1.0}$,--.

First Page, Column 2 (Other Publications), Line 21, insert
--PCT Notification Concerning Transmittal of Copy of International Preliminary Report on Patentability (Chapter 1 of the Patent Corporation Treaty) dated October 11, 2007 (1 pg).

PCT International Preliminary Report on Patentability dated October 3, 2007 (1 pg).

PCT Written Opinion of The International Searching Authority dated May 1, 2007 (3 pgs)--

Signed and Sealed this

Twenty-third Day of September, 2008

JON W. DUDAS
*Director of the United States Patent and Trademark Office*